US 6,545,705 B1

(12) United States Patent
Sigel et al.

(10) Patent No.: US 6,545,705 B1
(45) Date of Patent: Apr. 8, 2003

(54) CAMERA WITH OBJECT RECOGNITION/ DATA OUTPUT

(75) Inventors: Kirk Sigel, Ithaca, NY (US); Douglas DeAngelis, Woburn, MA (US); Mike Ciholas, Newburgh, IN (US)

(73) Assignee: Lynx System Developers, Inc., Woburn, MA (US)

( * ) Notice: Subject to any disclaimer, the term of this patent is extended or adjusted under 35 U.S.C. 154(b) by 0 days.

(21) Appl. No.: 09/058,542

(22) Filed: Apr. 10, 1998

(51) Int. Cl.$^7$ .......................... H04N 7/118; H04N 5/225
(52) U.S. Cl. ..................... 348/157; 348/169; 348/222.1
(58) Field of Search ................................ 348/135, 136, 348/137, 139, 140, 142, 143, 157, 159, 169–172, 207, 222, 222.1; 386/110, 117; 340/540; H04N 5/225, 7/18

(56) References Cited

U.S. PATENT DOCUMENTS

| | | | |
|---|---|---|---|
| 3,479,939 A | 11/1969 | Jones ............................. | 95/15 |
| 3,829,869 A | 8/1974 | Balko et al. ................... | 95/1.1 |
| 3,883,683 A | 5/1975 | Pardes ............................ | 178/6 |
| 3,883,684 A | 5/1975 | Ikegami et al. ............... | 178/6.8 |
| 4,047,221 A | 9/1977 | Yasuda et al. ............... | 358/136 |
| 4,156,870 A | 5/1979 | Desarzens ................... | 340/323 |
| 4,179,710 A | 12/1979 | Ishiguro et al. ............. | 358/135 |
| 4,182,330 A | 1/1980 | Michaels .................... | 128/260 |
| 4,235,871 A | 11/1980 | Papahadjopoulos et al. .. | 424/19 |

(List continued on next page.)

FOREIGN PATENT DOCUMENTS

| | | | | |
|---|---|---|---|---|
| CA | 2027526 A1 | * | 4/1991 | ............ H04N/7/12 |
| CA | 1292080 C | * | 11/1991 | .......... H04N/7/137 |

OTHER PUBLICATIONS

"MacFinish, A product of Intersoft Electronics", by Intersoft Electronics, Belgium, product description and specifications brochures, published in 1991. (23 pages).

(List continued on next page.)

Primary Examiner—Ngoc-Yen Vu
(74) Attorney, Agent, or Firm—Lahive & Cockfield, LLP (57) ABSTRACT

A line scan digital camera is directed at a station for recording and displaying a time-sequential scene. The digital camera takes a sequence of digital image frames representative of one or more bodies crossing a plane in space, wherein each frame represents a line image of the body, thus forming a fractional part of the scene, and the set of time-successive frames forms a recognizable image on an external display. Within the camera, frames enter a buffer and a microprocessor in the camera compares blocks from successive line images to detect changes indicative of objects entering or leaving the field of view. The changes detected by pixel or block analysis identify information-containing portions of the data stream and their time of occurrence. When the start or end of an object is detected the microprocessor flags the image stream with the detected data to produce an image data stream which can be more readily received and used by the external race management system, or the processor operates a controller in the camera which passes the active portion of the image information data stream to the output port, producing a more compact data stream with no loss of information. In a preferred embodiment, the camera is an event camera at a competition, and it images the finish line or an intermediate station to determine crossing times of contestants. Preferably, the microprocessor further detects optical patterns in the image so formed, such as bar code, numeric, or special marking features to identify contestants, or detects body features to determine estimated crossing times or other photocell determinations. This substantially automates the provision of race results, and allows relevant finish line pictures to be immediately presented to the judges from the raw image frames. The camera is also adapted to robotic vision applications for stations at irregular transport lines, and for mid-course identification and reporting along race tracks, transport lines and traffic environments.

20 Claims, 6 Drawing Sheets

U.S. PATENT DOCUMENTS

| | | | |
|---|---|---|---|
| 4,356,167 A | 10/1982 | Kelly | 424/38 |
| 4,610,868 A | 9/1986 | Fountain et al. | 424/1.1 |
| 4,702,585 A | 10/1987 | Harada et al. | 354/410 |
| 4,706,265 A | 11/1987 | Furukawa | 375/122 |
| 4,742,971 A | 5/1988 | Hügli | 358/213.26 |
| 4,743,971 A | 5/1988 | Hügli | 358/213.26 |
| 4,744,989 A | 5/1988 | Payne et al. | 424/490 |
| 4,754,342 A | 6/1988 | Duffy | 360/14.3 |
| 4,797,751 A | 1/1989 | Yamaguchi | 358/335 |
| 4,799,053 A | 1/1989 | Van Aken et al. | 340/703 |
| 4,809,067 A * | 2/1989 | Kikuchi | 375/240.23 |
| 4,825,390 A | 4/1989 | Van Aken et al. | 364/526 |
| 4,920,429 A | 4/1990 | Jaffe et al. | 358/471 |
| 5,008,739 A | 4/1991 | D'Luna et al. | 358/21 |
| 5,016,107 A | 5/1991 | Sasson et al. | 358/209 |
| 5,103,433 A | 4/1992 | Imhof | 368/9 |
| 5,105,395 A | 4/1992 | Imhof | 368/9 |
| 5,136,283 A | 8/1992 | Nobs | 340/799 |
| 5,136,376 A * | 8/1992 | Yagasaki | 375/240.12 |
| 5,144,425 A | 9/1992 | Joseph | 358/133 |
| 5,459,793 A * | 10/1995 | Naoi | 348/155 |
| 5,473,369 A * | 12/1995 | Abe | 348/169 |
| 5,493,331 A | 2/1996 | Takahashi et al. | 348/157 |
| 5,513,103 A * | 4/1996 | Charlson | 348/157 |
| 5,552,824 A | 9/1996 | DeAngelis et al. | 348/157 |
| 5,657,077 A | 8/1997 | DeAngelis et al. | 348/157 |
| 5,805,210 A * | 9/1998 | Sekiya | 348/157 |
| 5,923,365 A * | 7/1999 | Tamir | 348/169 |
| 5,966,074 A * | 10/1999 | Baxter | 348/157 |
| 6,014,167 A * | 1/2000 | Suito | 348/169 |
| 6,104,864 A * | 8/2000 | Kondo | 386/117 |

OTHER PUBLICATIONS

"2048 × 2048 Pixel, 12–Bit Digital CCD Camera", by Photometrics, product advertisement publication (no date available). (1 page).

"Photosprint OPS 2", by Omega Electronics, Product Description Publication, (no date available) 2 pages.

"Accutrack", by Specialty Instruments Corporation, product brochure, pp. 1–24.

"Time Tag Identification System", by American Sports Timing Systems, Inc., Topsfield, Massachusetts, product description brochure, (no date available). (7 pages).

"Key Innovations", by Seiko, Product Description Brochure, (no date available) pp. 9–13.

"Omega Electronics Introduces Video Photofinish System", by Kiefer Sports Timing Systems (sales agent for Omega Electronics), product description brochure, distributed in 1991. (18 pages).

* cited by examiner

CAMERA WITH OBJECT RECOGNITION/ DATA OUTPUT

TECHNICAL FIELD

The present invention relates generally to systems which monitor and record motion events, and it relates to cameras and systems for time-sequential imaging and display, with application in numerous fields. Most particularly, the invention provides a station imaging camera and system useful for measuring timed sporting events and imaging movement along defined tracks at stations. The invention also relates to systems and methods for generating a scene by compiling successively-scanned line objects, as described for example in applicant's commonly-owned U.S. Pat. Nos. 5,552,824 and 5,657,077.

Prior art systems employing standard photographic techniques to monitor the finish line of a race are known. In such a system, typically one or more cameras equipped for high resolution imaging view the finish line and capture sequential pictures at a high rate for later inspection by a judge or other interpreter. However, this process is cumbersome, wasteful, and time-consuming, in that it requires, for example, an apparatus of photographic film and paper, processing chemicals, and image enlargers or projection optics to be employed with their respective methods of operation, development and finishing. Consequently, most races rely on human judges and revert to "photo-finish" technology only in extremely close or important events. The Specialty Instrument Corporation provides a number of electronic and photo-finish systems of this type marketed under the trademark Accutrack. U.S. Pat. No. 3,829,869 exemplifies one such Accutrack system.

Because of the problems with the "photo-finish" technology, numerous other systems for monitoring racing events have been developed. However, these other methods and systems for timing sporting events present new difficulties. Video systems which record and display races in a standard television or video format are popular, but regardless of the particular implementation of these systems, a portion of the electronic image remains on an analog medium, such as recording tape. Since analog data from the systems consists of a continuum of information over time, it is relatively difficult to accurately apportion to a unique time interval. It is even more difficult to access a particular moment in time in the recorded sequence because the associated system must search the storage medium, typically having a long physical length in a spooled format, e.g., a video cassette. This presents both limitations and difficulties for users wishing to simultaneously record, view the current race, and review earlier segments of the race (or even a previous race) because only one user can have access to any of the information stored and recorded at any one time.

A further difficulty in analog data is that it must be converted to a signal usable for video, television, or a computer before it is displayed. For example, after a completed search, a selected video tape segment is typically sent to active memory before it can be processed by a computer and, quite possibly, by supplemental complex graphics generators. Altogether, the analog format and related processing adds to the time required to review a race and therefore lengthens the decision making process.

Another problem faced by race systems occurs in the management of extended time events, like a marathon or bicycle race, which can last for hours or until each entrant finishes. The runners or cyclists cross the finish line in groups; and for long periods, the finish line is void of persons. The relevant information at the finish line is thus sporadic, and includes significant amounts of "dead" time. In analog systems, this dead time is nevertheless recorded and stored so that the image record will retain time synchronism with the event, even though the intervening dead time images are generally useless for other reasons and add to the time required for processing and reviewing the race.

Several race systems have attempted to improve the management and accessibility of data taken during a race by transforming the recorded information to a digital equivalent. But, these systems also often revert to an analog format before displaying the race on a screen. As examples, U.S. Pat. No. 4,797,751 shows a video recording system having both digital and analog sections to provide display on a common cathode ray tube (CRT). U.S. Pat. No. 5,136,283 similarly describes another partially digital system which displays races on a standard television format. These analog/digital systems still have many of the problems inherent in entirely analog systems.

Linear sensor arrays or line cameras as described more fully in the above-mentioned commonly owned '824 and '077 patents, have now also been applied to such imaging tasks. These cameras have been used for assembly line imaging as well as for athletic competition finish line imaging. They offer the advantage of extremely accurate time resolution of a restricted area, namely of a linear strip imaged by the camera, and by taking a time series of frames directed at a fixed station, a two-dimensional linear/temporal or t,y-dimension image may be formed that bears a readily interpretable similarity to the customary optical spatial or x,y-dimension image of the scene. As set forth in applicant's above mentioned patents, the data stream from such cameras can be used to detect and deal with moving objects to provide high temporal and spatial resolution in real time. This entails transmission of a generally continuous stream of line image data to a processing system, which then attends to the annotation, indexing, compression and storage of the relevant views so that a small sub-portion of relevant views can be placed in digital random access storage and readily recalled, typically within minutes or seconds of the original image acquisition, for detailed inspection. However, effective use of such line-imaging camera systems has required extensive software-mediated data handling by a trained technician operating the system, and great demands are imposed on the data transmission and synchronization for effecting image assembly, time synchronization, and image frame recording and access.

It is, accordingly, an object of the invention to provide an improved camera and system for recording and displaying a time-sequential scene of bodies crossing a plane along a track.

These and other objects will become apparent in the description below.

SUMMARY OF THE INVENTION

The invention features, in one aspect, a camera for forming a time sequential scene of bodies moving across a plane in space, wherein the camera recognizes the appearance of an object within its limited field to trigger or flag its image output stream. The system includes at least one camera which is aimed to image objects crossing a line of interest, wherein the camera time-sequentially captures the object by imaging it onto an array of detector elements and converts the sampled signal into a digital line image, or frame, which passes to a frame buffer. Each digital image frame uniquely represents a fixed slice of the moving scene at a moment in time. A processor is situated within the camera, and communicates with the buffer, processing information from corresponding pixels or larger blocks of time offset frames to detect an object which has entered the line field of view and responsive thereto, controls the image data output stream or produces data coordinated with the image stream. For example, in one aspect, the camera detects arrival or departure of objects in the image field and thereupon operates to produce or enable an image data output stream, or to annotate the stream and enhance its information content by indicating such detection. In a basic aspect, the camera may detect entry or departure of a probable object at the image field, and tag or enable the relevant portion of the image stream. In a further aspect, the camera operates on the detected image data to make object-based determinations. In this aspect of the invention, the processor inspects image features, such as shape or orientation of the presenting features, or duration of the features, and confirms the presence of an object. It may then make a further determination, such as the identity of the object, or the probable crossing time of the object, to provide an output data stream which annotates information or results, greatly facilitating the processing of event data and the real time announcement of results.

In a basic embodiment, the processor detects the start of one or more objects crossing a finish line, and enables the image data output stream from the camera only during the interval when activity appears in that region. Static or background image frames may be flagged for separate or non-critical handling, may be sent to a separate port which interfaces with a data local storage unit, or may be simply suppressed and later be reconstructed from earlier or later frames. Thus, in one embodiment, frames of a displayed scene which add no information are removed, either temporarily or permanently, effectively withholding from the stream those frames in which there are no activity or bodies crossing the plane—while retaining a time reference for the remaining frames, which collectively display all the visible changes of a continuous scene. Alternatively, rather than suppressing the static portions of the image stream or acting as an on/off control of the output stream, the processor may simply flag the active (or the static) frames of the stream so that an external processor receiving the camera output is able to operate more effectively to code, index and store the relevant image frames in suitable memory locations for access, inspection, or other processing or reconstruction as appropriate.

In a further embodiment, the processor processes frame data when frame changes have indicated the presence of a contestant at the imaged field, to perform a photocell determination. This processing sorts or compares blocks of frame data corresponding to features, such as the head or body of a horse, or the arms, legs and torso of a runner, to confirm the presence and position of a finish line crossing. The processor then determines, typically by interpolation or back-interpolation, the line-crossing time, which may for example be associated with the nose of the horse, or torso of the runner. These determinations are typically made by software feature checking routines which scale the body size of the object to the expected velocity of the event and the frame rate of the camera to estimate the exact finish line time. By detecting body features in the correct order before triggering the finish line time determination, or by otherwise confirming the presence of an object, the camera avoids falsely triggering, for example on a shadow of a back-lit runner that may precede the actual crossing.

In yet another or further embodiment, the processor processes frame data to detect patterns or markings on the imaged objects, such as numbers identifying the contestants, and the output frames in which these objects or indicia were detected are flagged or indexed with the detected identifiers. The line camera may be set up at a plane of interest, such as the finish line of a race or an intermediate position along the track. In this case, the frame times may also be processed with the flagged identifiers at the observed plane, either the finish line or an intermediate position, to quickly show rankings or relative positions, speed or other ratings for immediate display in an automated manner without waiting for a judge's inspection of the digitally reconstructed images as required in previous image timing systems. The camera output augmented with this data thus directly interfaces with a computerized race management system so that desired frames are quickly accessed by their index information for review. A user at the computer console can command a variety of functions provided by the invention to manipulate and analyze the captured scene, most particularly to display any portion of the scene of bodies moving across the plane and access an associated time and/or identities of contestants for each frame within the sequence of line crossing images.

The system of the invention is particularly useful in recording and managing the official times of objects or entrants crossing a finish line in a digital race management system since it both preserves all imaging information and simplifies the storage, transmission and selective retrieval of finish line information. A user can therefore record and display the bodies crossing the plane of interest, i.e., the finish line, with accuracy while enhancing the ability to immediately employ information embedded in the images in real time, both to review and edit the stored images for finish determinations, and to effect fast automated display of unreviewed results. The invention thus provides an object-controlled compression and information enhancement of the camera output data.

The system constructed in accordance with the invention also provides, in another aspect, an in-camera memory subsystem communicating with an in-camera processor, wherein blocks of frame data are processed to detect an object, to detect a background, and to control start time and/or end time for active imaging segments which are to be transmitted out of the camera for analysis. According to this aspect of the invention, the processor may analyze imaged frames and set a retroactive start time for frame transmission, or a prospective end time to assure integrity of the preserved image record. A timer in the camera maintains a common time line, and the frames in transmitted segments are time labeled. In addition to finish line and mid-course tracking and identification, the camera and system are also useful for various photocell determinations.

BRIEF DESCRIPTION OF THE DRAWINGS

These and other aspects of the invention will be understood from the following description taken together with illustrative figures showing details of construction and certain preferred embodiments, wherein.

DETAILED DESCRIPTION OF THE INVENTION

Figure 1:
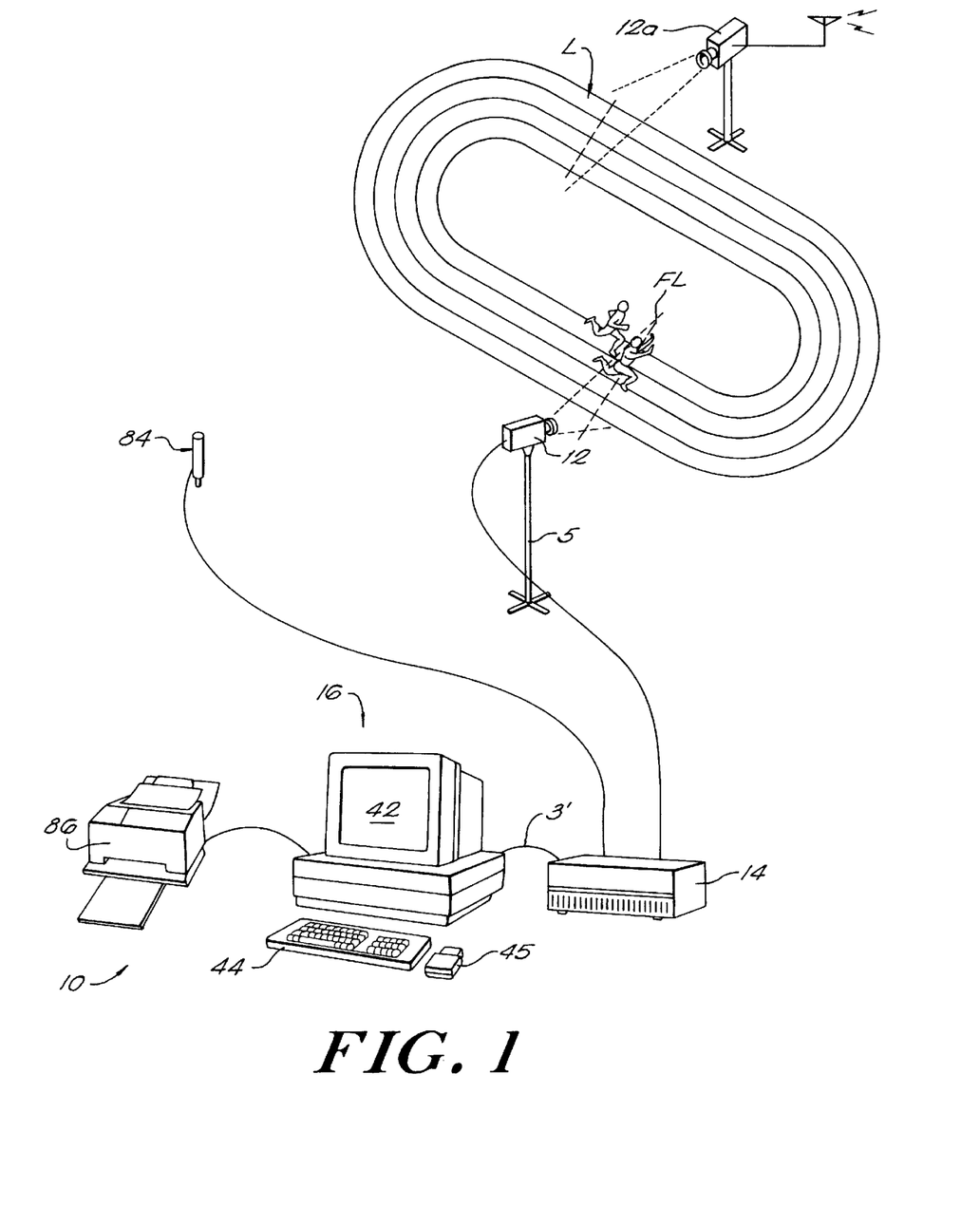
FIG. 1 illustrates a system employing a camera in accordance with the invention for recording and displaying a time-sequential scene of bodies crossing a plane.

FIG. 1 illustrates a camera 12 in accordance with the invention mounted in a system for imaging and recording a sequence of bodies crossing a plane in space, which illustratively is shown containing the finish line FL of a track. As discussed further below in connection with certain embodiments, a camera 12a may also be positioned to image an intermediate line L in a race monitoring system. In other aspects the system may be positioned to image a station in a robotic process line; however, for clarity of exposition below, the example of an event recording camera 12 is discussed in detail.

As shown in FIG. 1, the camera 12 is mounted on a stand S which places the camera above and to the side of the finish line, with the camera itself oriented and aligned such that the finish line is imaged onto a linear sensing array, the output of which is electrically scanned or sampled at a high rate to produce a time-resolved image data stream. Preferably the camera is positioned in the vertical plane of the line FL, and aligned so that the plane is projected onto the sensing array. For example the camera may be above and to the side of the track, or in certain cases may be mounted overhead. The camera is connected in a race management system 10 which includes the digital camera 12 and an image management computer 16 connected to various display or recording devices and interfaces.

Figure 1A:
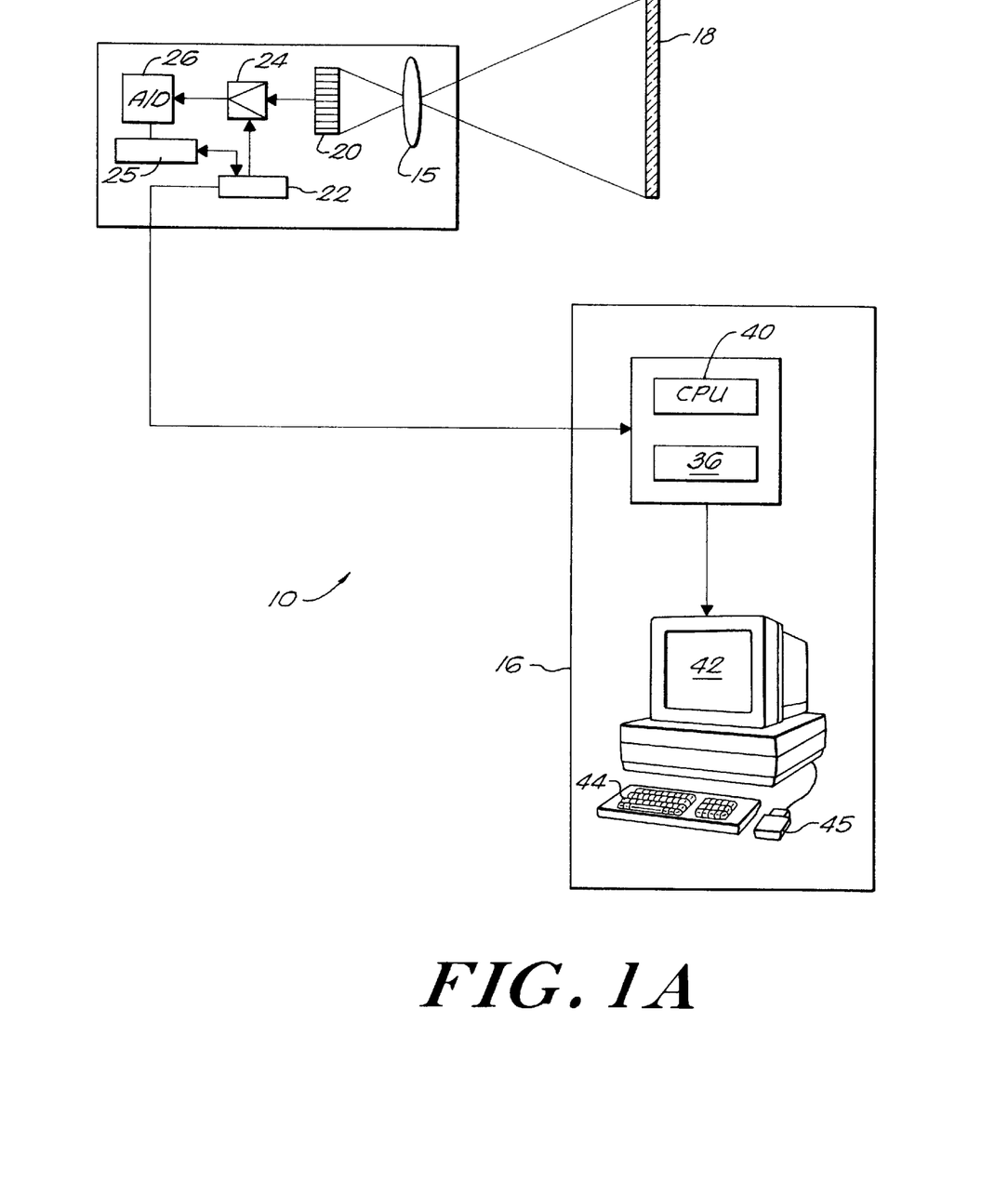
FIG. 1A illustrates further details of the camera and system of FIG. 1.

As shown more fully in FIG. 1A, the camera 12 of the present invention possesses an objective lens or optical assembly 15 which images a line portion 18 of the object field of its objective lens 15 onto an array of detector elements 20, preferably a Line Scan Charge Coupled Device (LS-CCD) having a pixel length of one thousand to several thousand pixels. An imaging controller 22 samples the detected light level at the detector elements 20 at successive times and amplifies the output signal with a gain controlled detector amplifier 24 and digitizes the processed signal with an A/D converter 26, to acquire successive frames of image data. The signal frames, each representing a line of pixels, are taken at a rate above several hundred lines per second, preferably about 400–1000 lines per second, and are stored in a buffer 25. Buffer 25 may, for example, be implemented with about one megabyte of VRAM, corresponding to somewhat under one minute of raw image frame data at that sampling frame rate. Each sampled image represents a frame of digital information at a unique moment in time, and may illustratively have the format of an ordered data string with a pixel value for each of a thousand successive pixels forming the line array. As set forth in greater detail below, the frames from the sensor and residing in the buffer are further processed in the camera to form the camera output stream.

The CCD 20 may be a monochrome (grey scale) or a color (e.g., RGB) CCD, but for clarity below shall be generally described as though it were a monochrome sensor, with only brief mention of several adaptations to color sensors where this is relevant for preferred implementations of object detection. In general, the color implementations utilize ordered triplets of light amplitudes rather than a scalar value, and may employ different data compression schemes tailored to the unique format of the data structures involved. Reference is made to the aforesaid commonly-owned patents for several useful details of implementation such as color palletization, data stream compression in the camera, and image management in the system 10 as a whole.

As further shown in the race management system of FIG. 1, a second camera 12a is positioned elsewhere on the track to image a line L, which may, for example, be positioned a few tens of meters after the starting line to detect the starting order of runners, or may, for example, be positioned at the quarter mile mark for a horse race to detect the order of horses and/or their times at that intermediate station of interest. Camera 12a is also connected to or in communication with the system 10, so that its image data is processed and stored, or is reviewed by an official, or is passed to a timing or display system. Preferably, the camera 12a communicates by wireless transmission, so that lengthy cabling, line matching and signal synchronization protocols and the like are not required for its set up. With this configurations, the camera 12a will in general provide its data during a time interval which is earlier from or distinct from that of camera 12, so it is generally not necessary to provide a second channel or an elaborate addressing or multiplexing protocol in the management computer to handle the output of camera 12a, because the data handling elements of the system 10 which process incoming images receive image data from only one of the cameras at a given time.

As discussed more fully below, cameras 12, 12a preferably each "crop" their image output stream. By "crop", applicant means that the cameras either send information only for the times of image activity, or else annotate the data stream with flags to indicate the portions of the stream which are active. In the latter case, the annotations are received with the image data stream and the processor of system 10 may operate with a higher degree of automation not requiring operator oversight or control.

In accordance with a principal aspect of the present invention, the imaging controller 22 in the camera performs these additional functions by operating on the frames acquired in the buffer 25 to detect object information in the image, and, responsive thereto, annotate or control the image data output on the output signal line 28 for connection to an external image management system 16. It will be understood that line 28 is shown for purposes of illustration as a line, but is more generally to be understood to be a communication link, such as a local radio frequency link so that the camera may alternatively send its data output by RF transmission.

Several representative object detection operations will now be illustratively presented. It will be familiar to those in the art that two-dimensional (line×time) image frames created by an event recording line camera appear smeared in the width direction, with the x- or width dimension proportional to the dwell time of the object at the imaged object line L or FL, and inversely proportional to the speed of the object crossing that line. Conversely, background field, when not obscured by a contestant passing in front of it, remains always the same, forming horizontal bands of fixed color or intensity passing through each pixel position of the line sensor 20. These are the image frames in buffer 25 upon which the object detector described below operates. Preferably each line image frame is marked with a time reference, so that this time information appears within the digital information of the frame. In a preferred embodiment, the time reference for each frame is indicative of the time the camera 12 captured the picture. This may be an absolute time, or a time relative to the start of an external event or trigger signal, and it may be derived from other signals, such as the signal from a start detection sensor 84 (FIG. 1), or an external time source, or an internal camera timer, preferably with a system time synchronization protocol as described in applicant's aforesaid patents.

In general, the external computer storage and image analysis system 16 may include elements such as software for adding text or linking images with identifying data to index the raw image data, and for indexing, accessing, and quickly displaying and analyzing the times appearing in the image data. Systems of this type are extensively described in the aforesaid two commonly owned U.S. Patents.

By way of context, the main control computer 16 of the external management system may have a central processor 40 that processes the blocks of information stored within an internal memory 36 and organizes the line frames into two-dimensional image frames for displaying the scene and time contents of a sequence of digital line frames on a display monitor 42. The central processor 40 preferably also controls the automatic operation and memory management of the system 10, and responds to inputs at the keyboard 44 and mouse 45 so that a user can selectively command the display of any scene captured by the system 10, including a real-time display or previously recorded segments. It is more particularly contemplated that a user can access the unique times associated with any portion of the scene for immediate announcement of finish times and view the frames for visual resolution of close finishes. Computer outputs may also be configured to drive external displays such as signboards, for announcing results, and remote monitors for simultaneous viewing by judges. A number of desirable features of such external race management systems have now appeared in several commercial products, and no further description of their operation need be given here.

Figure 2:
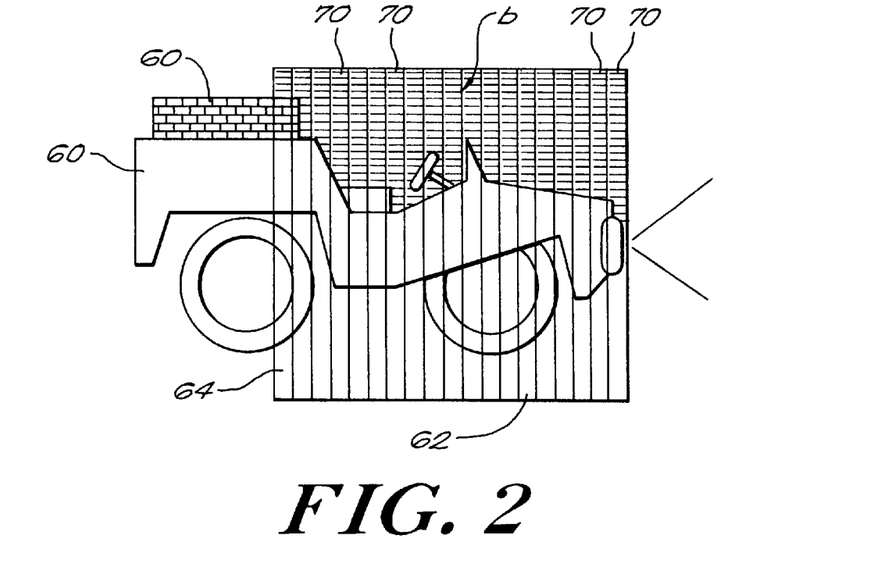
FIG. 2 shows a representative image constructed according to the invention from discretely sampled line objects.

Further, by way of example useful in understanding the time and position determinations made and recorded in applicants line camera systems, FIG. 2 illustrates an object 60 which is in motion along a horizontal axis, and wherein a camera (not shown) is focused on the object 60 with a field of view (FOV) substantially in the vertical plane across that axis. As each frame is captured, a portion of the object 60, i.e., a line object, is uniquely and spatially represented as a digital line image frame. In FIG. 2, the successive line objects captured by the system are illustratively shown on the object 60 as successive rectangular stripes 62. For each of the line-images 62, the digital camera 12 correspondingly generates a frame by sampling the image of the line object according to the number of detector elements within the array 20. That is, each of the line objects 62 is digitally segmented along its length by projection via the camera objective onto the line sensor 20, forming a digital image frame having the number of pixels present and sampled in the detector array 20. In a real-time aspect, line frame 64 represents the most recently captured frame, and the remainder of the object 60 to the left of line frame 64 has yet to be captured by the system, while those lines 62 to the right of line 64 have already been captured as the object 60 moved through the object plane. A series of successive line frames are then assembled next to each other to form a picture.

A scene or composite image of an object assembled in this way when displayed on the computer 16 appears very much like an actual spatial image of an object passing by the FOV of the camera 12, especially when the object moves at a relatively constant speed and when the frame rate is selected in a proportion to the expected speed of the object such that the width dimension is not appreciably expanded or reduced from the normal spatial representation of the imaged object.

Notably, in such images, any stationary background 70 in the field of view which lies along the finish line, such as a wall, is imaged identically in successive line images, so that when a frame is assembled from successive lines, the background appears as horizontal stripes each having the fixed color or intensity of the imaged stationary feature.

Figure 3:
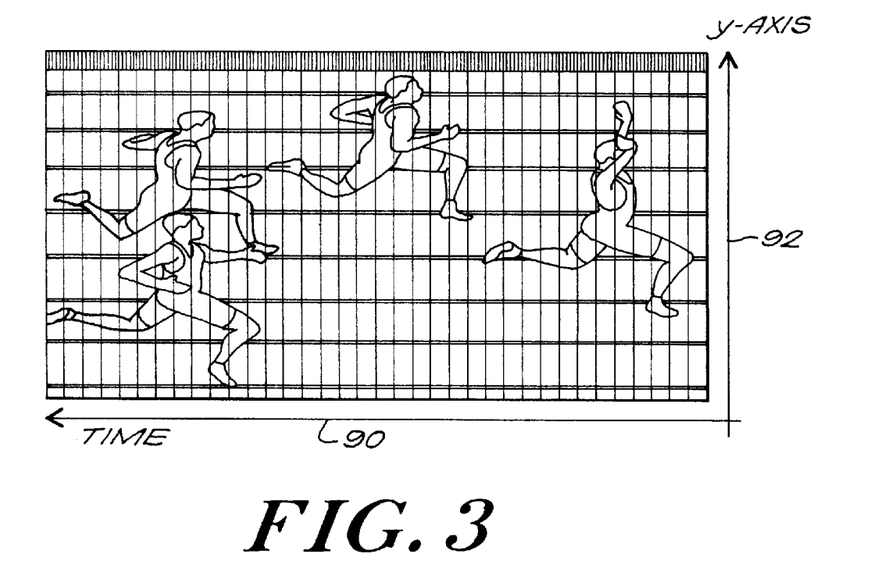
FIG. 3 illustrates a typical display of a racing scene generated by a system in accordance with the invention.

FIG. 3 illustrates a typical image frame formed in this fashion of a group of runners crossing a finish line. Among the artifacts due to the mode of generation of this image, it is apparent that the background appears as a set of horizontal stripes when not occluded by a runner, and each runner appears frozen in the exact posture he assumed as successive strips of his body crossed the finish line. Nonetheless, except for a slight dimensional stretching or compression effect along the lateral direction, each runner appears approximately as in a normal spatial image taken from the perspective of the fixed camera position. Thus his suit color, entry number, facial traits and other identifying features are, or would be, captured in the image.

Returning now to a description of camera operation, each digital line frame captured by the system 10 of FIG. 1A is stored in the buffer 25, and the control microprocessor 22 operates on this line image data to control the camera output. The invention contemplates several different forms of object recognition and output control, examples of which will now be described. First among these is the recognition of an object moving across the line FL.

Figure 4:
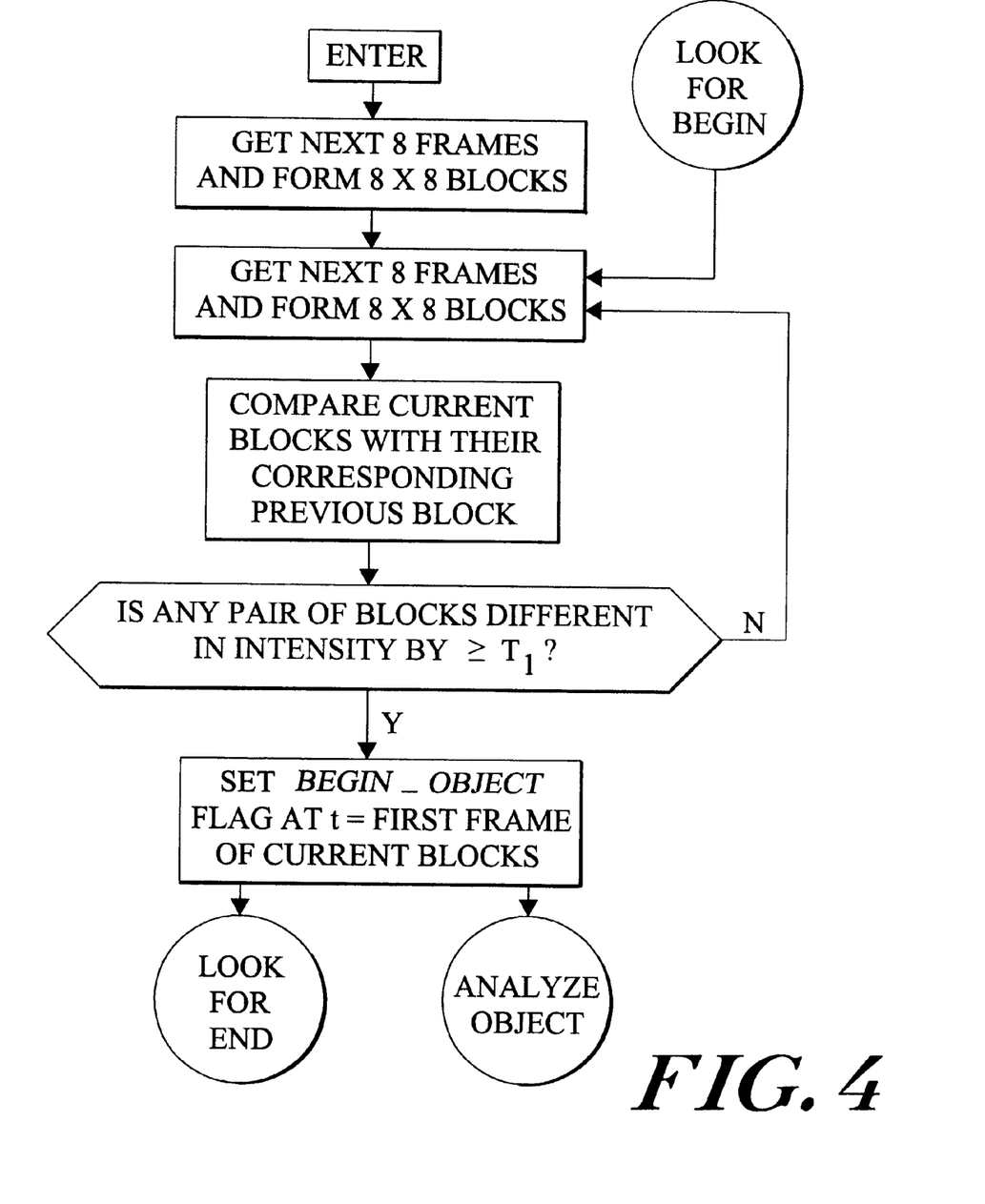
FIG. 4 illustrates operation of an in-camera detector for image output control in accordance with the invention.

FIG. 4 is a flow chart illustrating this operation in a basic prototype embodiment of the invention. In this embodiment, the microprocessor 22 in the camera processes raw image frames from the buffer 25 to detect the presence of an object moving across the line field of view, and it controls the output data stream so that the image frames are sent out by the camera only when there is finish line activity, while precision time marking is maintained. In terms of hardware, the microprocessor loads the line frames into VRAM of moderate size, e.g., a 2 MB VRAM, and then processes successive lines to detect finish line activity. In a further aspect, when a pattern of probable motion is detected, the processor confirms the pattern, and retroactively tags the start of the active image sequence for transmission out of the camera, while inactive frames or "dead time" images are simply compressed, deleted, or even sent to tape backup without occupying system bandwidth.

In addition to the buffer storage or VRAM, the camera's internal microprocessor 22 preferably has a RAM capacity of about 32 MB or more, allowing the camera itself to store up to several minutes of time-resolved active finish line images. This is far longer than the typical duration of line-crossing images in a track or equestrian event, so that in the event of a faulty external transmission link or equipment failure, the relevant scenes remain available for analysis in the camera memory.

As shown in FIG. 4, the object detection proceeds by detecting the beginning of an object entering the image field. This is done by a sorting/comparing procedure on the incoming line image frames to determine a likely entry of an object into the field, and confirm it. First, the processor loads a set, illustratively eight, of image lines to form a sample strip eight by one thousand pixels in size, and partitions the strip into 8×8 blocks. Each strip thus comprises a vertical column of 125 8×8 light-sampling blocks. The microprocessor then loads and similarly partitions the next eight image lines so that it has two 125 block sets of light values, and then proceeds to compare the pixel values of each block with those of the immediately preceding corresponding block of pixel values, to develop a measure of the amount of localized change in the successive image light values. The comparison may, for example, take the difference in the sum of pixel values of each block. If the difference, representing the total change in intensity of the successively detected light values, is less than a threshold $T_1$, e.g., 10% of the total pixel summed amplitude, in all blocks, then the processor simply fetches the next eight lines, partitions it into blocks, and again performs a similar comparison, proceeding in this fashion until a light value change above the threshold level is detected.

It will be readily understood that the stationary background, imaged at constant intensity and position, will in general fluctuate by the noise level of the pixel sensors. In addition, when the scene is an indoor scene illuminated by artificial light, extreme periodic fluctuations in light intensity at the line frequency will occur. Thus, the use of multiple successive lines and multi-pixel averaging blocks to detect change serves to decrease the effect of noise and periodic light variation on the detection of a meaningful change in light level. Thus, a 50–60 Hz line signal, with 100–120 zero-crossings per second will require a block of about 80–100 msec duration to assure that aliasing of the sample period and the illumination flicker does not result in false readings. The detection threshold $T_1$ is set to be greater than the expected normal or noise fluctuation of the 8×8 blocks. A value of ten per cent of the total amplitude is a useful threshold value for determining a significant movement into the field of view.

As further shown in FIG. 4, when a block intensity difference greater than the $T_1$ threshold is detected, the processor sets the BEGIN-OBJECT flag at the time $t_0$ of the first line of the current block. In alternative embodiments, the processor may wait for two, or more generally n blocks in a row to differ, so that it confirms the sustained presence of an object before it annotates the image data or sets an output control signal. In that case the camera starts counting, and when the block value remains different and above the threshold for at least, e.g., five consecutive blocks in time, the change is recognized as being due to an object moving across the field of view. The processor retroactively sets the BEGIN-OBJECT flag at the start of the active sequence. The flag data may be sent as a separate data indication along with the continuous image data stream to facilitate external processing and indexing of the line image data, or the flag data may be used to directly initiate the output of image data from the camera commencing at time $t_0$, so that image data is sent to the output port only when an object has been detected. In another embodiment, the camera may be set to catch the image data starting at a preset time before the first detected change frames, for example at 0.1 seconds before the first detected change, so that the finish line sequence will include images as the contestant nears the finish and shows the first parts of a contestant crossing. Thus, the nose of a horse, or hand of a runner, will appear before the torso breaks the ribbon. Such details, while coming earlier than the event which is traditionally recognized as crossing the line, are useful for resolving ambiguities when multiple contestants cross nearly simultaneously. For example, a projecting hand may be followed to identify the position of a contestant even when the torsos of several contestants are simultaneously occluded or overlapping in the field of view. Thus, the active image sequence may be set to include a fixed leader portion.

Figure 4A:
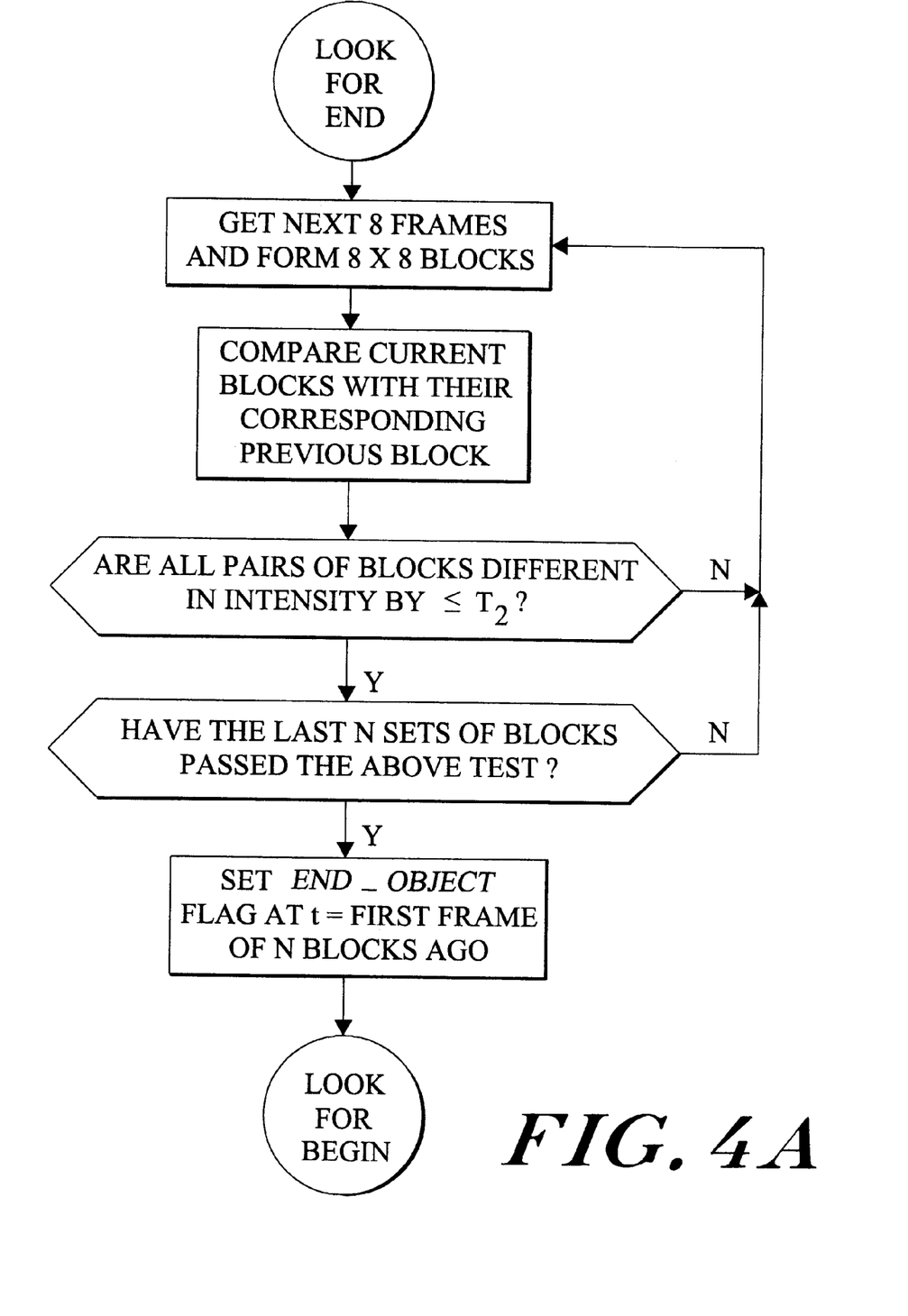
FIG. 4A illustrates internal object detection processing for output control.

As further shown in FIG. 4, once the runners have been detected in the image the processor then switches to a different analysis procedure which monitors or analyzes the object now appearing in the image frames to derive additional information. In a basic embodiment, the processor continues processing sample image strips in a manner somewhat analogous to the initial object-trigger analysis, to determine when the object has passed or the finish line activity ceases. A suitable set of determinations is shown in FIG. 4A for this aspect of the processing. When the end of the object is detected, the processor then sets an END OF OBJECT flag, preferably causing the output controller to turn off the output stream or enter a dormant mode. For this latter detection, the processor detects whether all pairs of blocks differ by less than a threshold $T_2$. Advantageously, the processor may employ a different threshold, $T_2<T_1$ or may require that a sub-threshold level of homogeneity persist for a greater number of sample strips, or both, before concluding that the moving objects have passed. This operation avoids falsely signaling the end of a sequence when in fact a relatively homogeneous object, such as the body of a horse, rather than the stationary object has remained in the field of view front of the camera. For this determination in a color camera embodiment, the detection module may be advantageously set to use color change rather than, or in addition to, intensity as a detection measure. When the end of activity is detected, the END OBJECT flag is at the first line of the group of frames that attained the static signal level, or may be set a fraction of a second thereafter, to signal the output control to cease transmitting line image output, or to label the frames when the cropping operation is restricted to annotation of the frames rather than physical switching of the camera output stream.

Thus the object recognition output controller first identifies a potential moving object, confirms the presence of motion, and then retroactively identifies the active image frames. Similarly, to end the sequence, it identifies a potential stationary scene, confirms it, and sets the end cropping time to extend at least to the last active frame. In this manner only the image segments necessary for detecting, recording and judging movement across the finish line are annotated or sent from the camera, and these are automatically selected by the camera internal controller based on object detection. Automated object recognition in this manner eliminates the need for a human monitor to view and select image data at an external console, and reduces the need for massive external rolling image buffers and quick-access memory storage units since the relatively small subset of active image frames are pre-identified by the camera.

As previously noted, when no object is crossing the finish line, the background scene is static. As described more fully in applicants' aforesaid patents, by using a line-to-line compression algorithm, the amount of data to code a static sequence is greatly reduced or essentially eliminated, and by performing compression in the camera, external data buses need not handle the massive data flow of the raw line images. The system of the present invention however offers an additional operating improvement, in that the camera internal processor effectively sends only short intervals of highly-relevant image data, and, as viewed by the system 16, it effectively appears to turn itself ON and OFF exactly when needed. Indeed, when operated with in-camera random access memory of only 32 MB, the camera may also effectively store the entire relevant set of data for a single race, since this typically amounts to only a half minute or less of actual finish line crossing scenes. Since each line frame includes the time it was imaged, the beginning and end times are all that is needed to reconstruct the static dead time scenes from the last frame.

In addition to flagging the active segment of the image data generated by the camera's line sensor, the invention contemplates further internal processing of identified object to produce object-based data. This is shown schematically in FIG. 5. Two distinct types of data will be briefly illustrated. One is object identification, which proceeds by way of image analysis subroutines to detect color, number, bar code or other individual features of the contestants as they pass. This is discussed in greater detail below. The second, which will now be discussed, may be called "photocell determinations". In accordance with this latter aspect of the invention, the in-camera processor performs a more detailed image analysis of the object-containing frames to fit the contestant to a template, recognizing defining parts of the body, and then applies a species/event specific interpolation or estimation rule to determine the probable crossing time.

Figure 5:
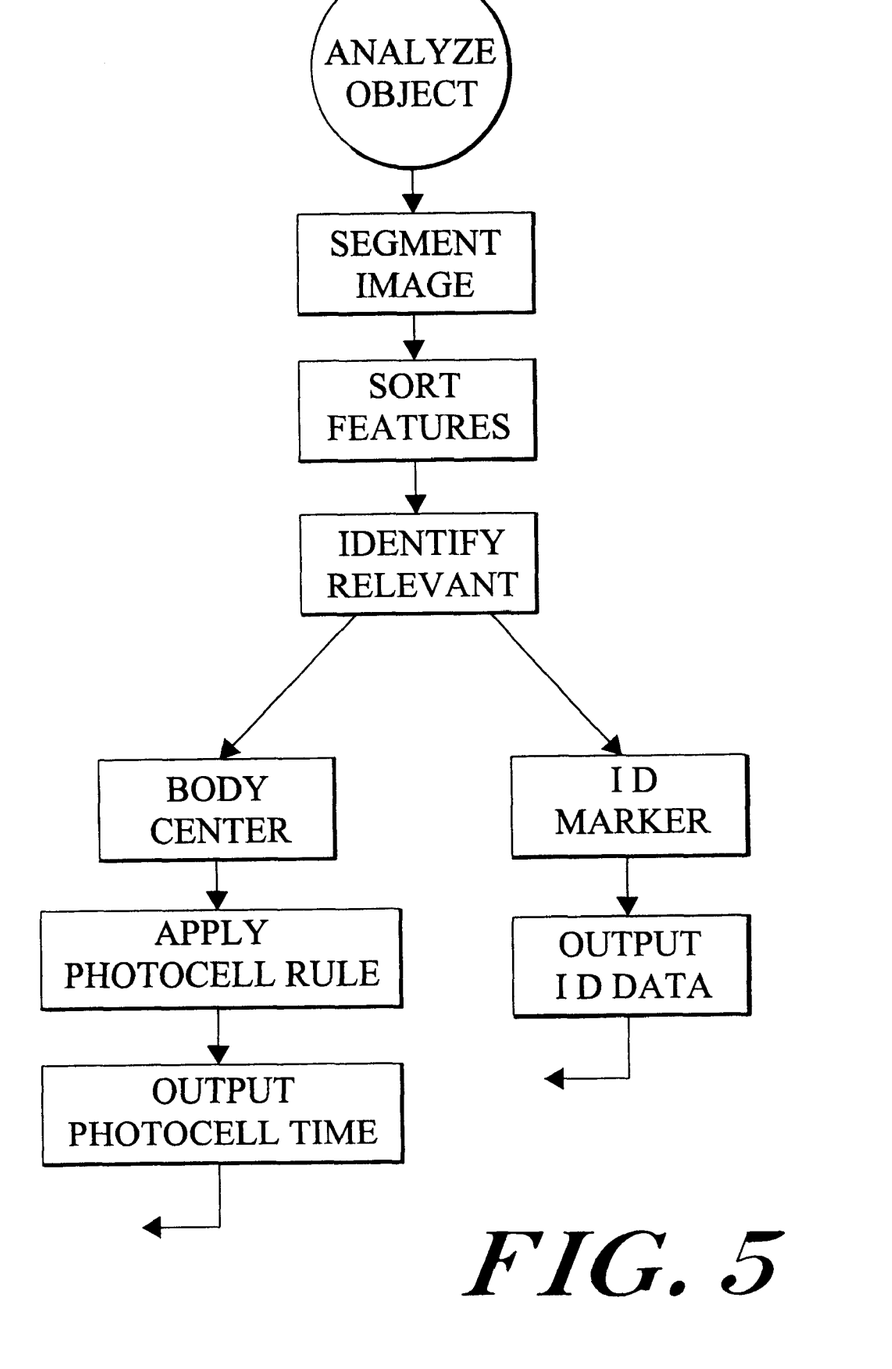
FIG. 5 illustrates further object information processing.

As applied, for example to a horse, the processor may process direct-overhead image lines to detect the body of a horse crossing the line, then, while correcting for frame rate and event speed (which affects the horizontal distance scale), identify the crossing time by the frame which occurred a fixed time or distance before the mid-point of the body. This estimation procedure will produce an estimated time, based on a standard species size and shape, which can be used for initial announcement scoreboard displays. For example, the processor may set the "nose" of a horse to be 1.6 meters ahead of its center, or the nose of a greyhound to be 0.7 meters ahead of its center. By adding the identified time to the image output data stream, an immediate index is provided to the race management system, and full-frame images may be immediately constructed and reviewed to determine the exact crossing time. Inspection of FIG. 3 shows a typical crossing configuration for a human track event. As applied to a person, the relevant image analysis may be triggered by the initial appearance of a hand, arm or leg in the field. In that case, the image analysis may proceed by a fixed rule, such as setting the probable crossing to be about 30–50 centimeters after the initial limb, or it may proceed with further image analysis to detect the central mass of the body, e.g., the torso or stomach, and to set the estimated crossing time at the appearance of this feature. A race official would then view the image frames so identified to determine the exact crossing time by observing, for example, whether the torso were angled forward, and seeing which line of the composite frame actually contained the leading edge of the torso. Other photocell crossing determinations may be readily implemented by employing rules specific to the speed of the event and the species of contestants.

Returning now to a description of the object recognition and feature recognition aspects of the camera, we note that the above description of object detection has spoken of pixel values as though they are a scalar quantity. However when a three color line camera is employed, the determination of movement may proceed differently to achieve faster processing, more accurate object detection or even detection of particular features or identifiers. In one such variation for simple object detection, the three different color values of the blocks in successive sample strips are compared separately, and their differences summed separately to provide a more refined test of scene changes. For example, the sudden appearance of red pixels when red had been entirely absent would immediately indicate a new object arrival. This color comparison detection allows a smaller size block to be used for the object recognition determination. Alternatively, the contestants may be actively assigned markers or jerseys of distinctive colors to identify each one by a color or set of colors conspicuously carried or appearing in their attire. The processor in that case is preferably programmed to store the colors associated with each contestant in the image (e.g. royal blue=Joe Smith=contestant 17) and to provide that data in the output stream.

Alternatively the external race management system may compare the detected color identifiers to a previously established table of runners' identities. In this case the color-annotated image stream received from the camera has its color and time components passed to a simple subroutine which checks the color against an identification table and signals the runner's name on a display. Such an identification table may be set up during an initialization procedure, preferably implemented in the external race management system, during which, for example, a separate hand-held camera is pointed at each contestant and the contestant's identity is entered as a processor analyses and logs the distinctive color and sets up the identification table. In this case, the object-controlled line camera of the present invention may perform additional processing to provide the necessary identification data, for example as an alphanumeric record in the preamble of each line image frame occurring in its output data stream.

Applicant further contemplates that when the controller 22 is operated to identify the particular objects in its view, the processor will perform other or additional image analysis beyond the detection of threshold light changes or color determinations. Such additional processing may for example include edge recognition and object segmentation to separate the overlapping images of runners and determine what individual colors are carried when a relatively small image region contains several colors at once. The invention also contemplates systems wherein a special identification marker is worn by each contestant so as to be visible in the image. Thus, for example, when used for an equestrian event, the markers may be attached to the top of each horse's back, and the camera may image the finish line (or an intermediate station along the track) from directly overhead so that all markers are oriented directly toward the camera and no marker is ever blocked by the adjacent runners. Such markers may include, for example, oriented bar codes, or lines or blocks of different colors forming a distinctive combination. The color markings may also be advantageously shaped to assure quick and dependable detection. This may be done, for example by arranging the different colors in color bands which are oriented in a manner to assure that they are imaged on separate detection pixels of the camera or have a substantial dwell time on the detecting pixels. For example, the bands may be worn parallel to the direction of motion, giving them an extended dwell time in the image, and be offset across the direction of travel so that they are imaged onto different pixels of the sensor. They may also, where size permits, be offset along the direction of travel, leading to temporal resolution of the color combination in the image. This makes them readily detected when the line images are sampled in blocks of narrow height along the image sensor or are imaged for only a short time duration.

In yet other embodiments, the processor may incorporate an optical character recognition module to simply read the number on a contestant's jersey, or may process the image lines using patterns of a bar code reader to recognize bar code identifiers. In general, however, the use of a mark configured for line-camera detection, and preferably color identification markers is preferred to the use of character or bar code technology, in order to reduce the possibility of occlusion and misreading of the sought-for markers.

When used as an event recording system, such as at the finish line of a race, the object triggered line scan camera system of the present invention may be operated to record and resolve positions one thousandth of a second apart, or less, while greatly reducing the real time bandwidth demands imposed on external system elements, and without introducing any noticeable delay in the transmission of necessary image data. The data annotation of output frames, even without physical cropping of static or dead time images, also results in a system wherein the data handling and RAM storage demands placed on the external race management system are reduced.

The invention being thus disclosed and representative embodiments and features thereof described, further variations modifications and equivalents will occur to those skilled in the art, and all such variations, modifications and equivalents are considered to be within the scope of the invention, as defined by the claims appended hereto.

What is claimed is:

1. An event recording camera system for forming a time sequence of images, comprising
    a camera which generates a first sequence of digital line image frames of a fixed position in space, each frame of said first sequence representing a line image view that is captured by said camera at a moment in time and imaged onto an array of detector elements, said first sequence including active segments imaged at times wherein moving objects cross said fixed position, and inactive segments wherein no moving objects cross said fixed position
    a buffer in said camera for storing said first sequence of frames as they are generated, and
    a processor in said camera operative on said first sequence to detect an object and produce an object detection signal so as to selectively present said active segments at a camera output.

2. A system according to claim 1, wherein said processor communicates with the buffer to receive data from frames of said first sequence and compare data from successive frames to detect an object, such that said processor retroactively identifies start of an active imaging segment.

3. A system according to claim 1, wherein frames of the active imaging segment include frame time information.

4. A system according to claim 1, wherein said processor communicates with the buffer to receive data from frames of said first sequence and compare data from successive frames to detect end of an object, and sets the end of an active imaging segment.

5. A system according to claim 1, wherein the active imaging segment includes object identification information.

6. An event recording digital camera including an optical imaging element for forming a light image of a restricted visual field, and an image sensing element for generating a digital image frame from the light image, timing means in said camera for generate time signals and a processor in said camera operative on a sequence of said digital image frames for detecting movement of an object in said restricted visual field, and providing an information output in response to said detection,
    wherein said image sensing element is a line sensor and said processor processes data from plural frames to detect identifier information carried by said object in said restricted visual field, and wherein said processor further provides an active segment with the object identifier information whereby image data transmitted out of the camera is suitable for automated display of identity data.

7. A digital camera according to claim 6, wherein the processor includes a memory, and said processor identifies active imaging segments in said memory in the camera.

8. A digital camera according to claim 6, wherein the processor crops said sequence by identifying start of an active segment and transmitting image frame data with time markings commencing at the start of the active segment.

9. A digital camera according to claim 8, wherein said line sensor generates frames at a rate substantially over one hundred frames per second.

10. A digital camera according to claim 9, wherein the processor detects bar code, number or color coded identifiers carried by the object.

11. A digital camera according to claim 6, wherein the processor detects object features to produce a photocell determination.

12. A digital camera including an optical imaging element for forming a visual image of a field, an image sensing element for generating a multi-pixel electrical output from the visual image, and circuit means in said camera for processing said multi-pixel electrical output to provide an image data stream including digital value image pixels, wherein said circuit means includes a processor operative on said image pixels to identify information bearing portions of said data stream and control camera output to transmit said information,
    wherein said image sensing element is a line sensor and said processor processes data from plural frames to detect identifier information carried by an object in said visual field, and wherein said processor further provides an active segment with the object identifier information whereby image data transmitted out of the camera is suitable for automated display of identity data.

13. A digital camera according to claim 12, wherein the processor annotates the image data stream with data codes indicative of at least one of start of object, end of object, and identity of object.

14. A digital camera according to claim 12, wherein the processor controls output of the camera to selectively pass image frames containing moving object images.

15. An event recording video camera comprising
    means for imaging a visual field
    a line sensor for converting a line portion of the imaged visual field into electrical signals representative of pixels of the image of said field
    circuit means for processing said electrical signals to form a digital output stream containing digitized pixel values of a sequence of frames at a high scanning rate
    a buffer for storing said digital output stream before transmission, and
    a processor operative on contents of the buffer for comparing sets of data from the buffer and identifying image data associated with moving objects, said processor controlling said output stream responsive to the identified data.

16. A video camera according to claim 15, wherein said processor compares block sum light values to detect beginning or end of object motion in the visual field.

17. A video camera according to claim 15, wherein said processor image-processes blocks of frames to detect an object identifier and controls said camera to transmit image data annotated with an indication of object identifier.

18. A video camera according to claim 15, wherein said processor image-processes blocks of frames to detect an object feature and controls said camera to transmit image data and estimated crossing time data.

19. A video camera according to claim 15, wherein said pixel values include color values and said processor processes values for each color separately.

20. A video camera according to claim 15, wherein the processor compares blocks of image frames over time to detect a change indicative of image frame activity and said processor applies a different threshold to detect end of image frame activity than to detect start of image frame activity.

* * * * *